United States Patent [19]

Schoenberg

[11] Patent Number: 4,784,305
[45] Date of Patent: Nov. 15, 1988

[54] GOLF ACCESSORY

[76] Inventor: Kenneth Schoenberg, 4206 Pleasant Valley Rd., Brighton, Mich. 48116

[21] Appl. No.: 102,730

[22] Filed: Sep. 30, 1987

[51] Int. Cl.⁴ ............................................. B60R 9/08
[52] U.S. Cl. .................................. 224/274; 224/918; 206/315.1
[58] Field of Search .............. 224/274, 918, 919, 224; 206/315.1, 315.9

[56] References Cited

U.S. PATENT DOCUMENTS

| | | | |
|---|---|---|---|
| 1,911,256 | 5/1933 | Andrew | 224/919 X |
| 2,548,330 | 4/1951 | Wiseman | 224/919 X |
| 2,665,830 | 1/1954 | Fowler | 224/918 X |
| 2,780,508 | 2/1957 | Bonderer . | |
| 3,156,000 | 11/1964 | Westhoff . | |
| 3,799,331 | 3/1974 | White | 224/918 X |
| 3,968,522 | 7/1976 | Riess | 224/918 X |
| 4,062,482 | 12/1977 | Szalony | 224/919 X |
| 4,082,209 | 4/1978 | Sanders . | |
| 4,106,678 | 8/1978 | Thomas | 206/315.9 X |
| 4,151,936 | 5/1979 | Hawkes | 224/224 |
| 4,296,874 | 10/1981 | Evans | 224/919 X |
| 4,632,245 | 12/1986 | Lerner | 206/315.9 X |

Primary Examiner—Henry J. Recla
Assistant Examiner—Robert Petrik
Attorney, Agent, or Firm—Gifford, Groh, VanOphem, Sheridan, Sprinkle and Dolgorukov

[57] ABSTRACT

A golf accessory having a housing with two elongated tubes which are open at which end. Each tube is dimensioned to receive a plurality of golf balls therein and each tube has a longitudinally extending slot extending along one side and between its ends. A stop member protrudes into the interior of each tube adjacent each end which abuts against the golf ball positioned within the interior of the tube to hold the golf balls within the tube. Each tube, however, has a flexible side wall portion adjacent each end which flexes outwardly to enable a golf ball to pass over the stop member and out of the tube. The golf accessory also includes a plurality of openings which are designed to slidably receive and frictionally engage golf tees, golf ball markers and golf green repair tools.

5 Claims, 2 Drawing Sheets

GOLF ACCESSORY

BACKGROUND OF THE INVENTION

I. Field of the Invention

The present invention relates to a golf accessory particularly designed to hold golf balls and other golf devices.

II. Description of the Prior Art

In the game of golf, the golfer typically keeps golf balls in a loose pile at the bottom of the golf bag. Such golf balls also include damaged golf balls, old golf balls as well as new and undamaged golf balls. Many golfers will select an old or damaged golf ball when the risk of losing the golf ball is relatively high, for example, when a water hazard is near, while, conversely, they will use a new, undamaged golf ball when the risk of loss is low.

With the previously known means of storing golf balls, however, the golfer frequently must sift through the numerous golf balls at the bottom of the golf bag until the proper golf ball is found.

Golf tees, golfing repair tools and golf ball markers are also frequently in the pile of golf balls at the bottom of the golf bag. Location of one of these devices when needed is frequently a time consuming and frustrating event.

SUMMARY OF THE PRESENT INVENTION

The present invention providea a golf accessory which overcomes all the above mentioned disadvantages of the previously known practices.

In brief, the present invention provides a golf accessory which is particularly designed to hold golf balls, golf tees, golf ball markers and golf green repair tools. In brief, the device of the present invention comprises a housing having two elongated tubes which are open at each end and having an interior dimensioned to slidably receive a plurality of golf balls. Each tube also includes a longitudinally extending slot along one side and this slot extends between the ends of the tubes.

A stop member protrudes into the interior of each tube adjacent each end. The stop member is dimensioned so that the stop member abuts against a golf ball contained within the itnerior of the tube and thus retains the golf ball within the tube until removal by the golfer is desired.

A flexible side wall portion is also formed adjacent each end of the tube. This flexible side wall portion flexes outwardly to enable a golf ball to pass across the stop member and out of the tube when desired by the golfer.

Preferably, the tubes are spaced laterally apart from each other and one or more openings are formed in between the tubes. These openings are each dimensioned to slidably receive and frictionally engage a golf tee to thus hold the golf tee to the housing. Similarly, a slot is also formed in between the tubes which is dimensioned to receive and frictionally retain a golf green repair tool. Similarly, a block plate extends outwardly from the housing along one end of the tubes and this back plate includes one or more openings which slidably receive and frictionally engage a golf ball marker.

Preferably, the entire accessory is of a one-piece construction and preferably formed by injection molding.

BRIEF DESCRIPTION OF THE DRAWING

A better understanding of the present invention will be had upon reference to the following detailed description of the present invention when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
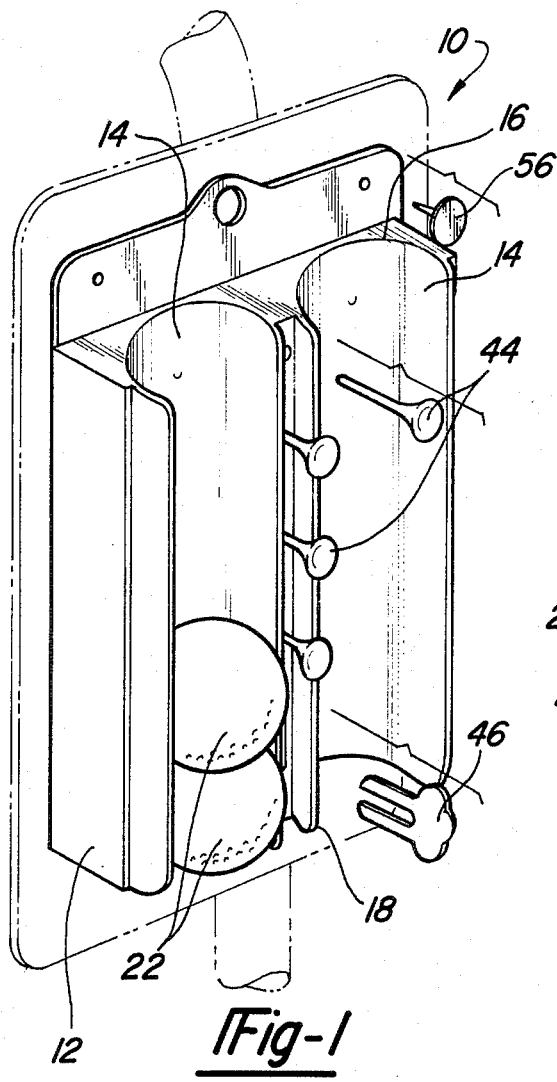
FIG. 1 is a perspective view illustrating a preferred embodiment of the present invention.
Figure 2:
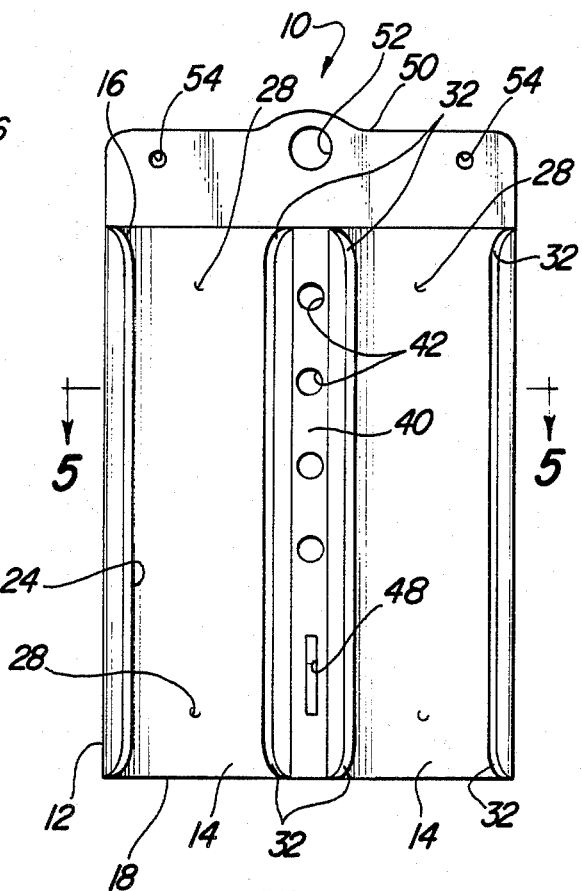
FIG. 2 is a plan view illustrating the preferred embodiment of the present invention.
Figure 3:
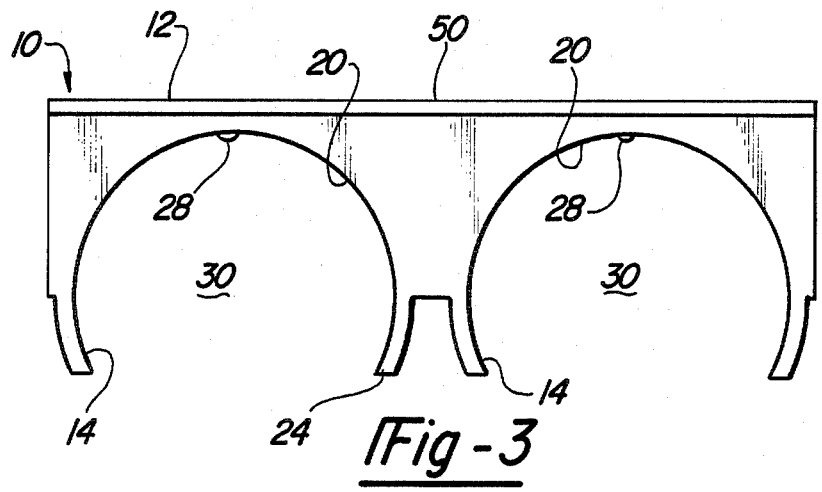
FIG. 3 is a top view illustrating the preferred embodiment of the present invention.

With reference first to FIGS. 1-3, a preferred embodiment of the golf accessory 10 of the present invention is thereshown and comprises a housing 12 which is preferably of a one-piece construction. The housing 12 includes two elongated tubes 14 which are spaced and generally parallel to each other.

Still referring to FIGS. 1-3, each tube 14 is open at each end 16 and 18 and has a semi-circular crosssectional shape 20 (FIG. 3) which is dimensioned to slidably receive a plurality of golf balls 22 (FIG. 1). Furthermore, an elongated slot 24 extends along one side and between the ends 16 and 18 of each tube 14. As best shown in FIG. 3, the elongated slot 24 has an angular width of less than 180°.

With reference now particularly to FIGS. 2 and 3, a stop member 28 protrudes into the interior 30 of each tube 14 adjacent each end 16 and 18. This stop member 28 is dimensioned so that it frictionally abuts against and retains the golf balls 22 within the interior of the respective tubes 14 and 18.

Figure 6:
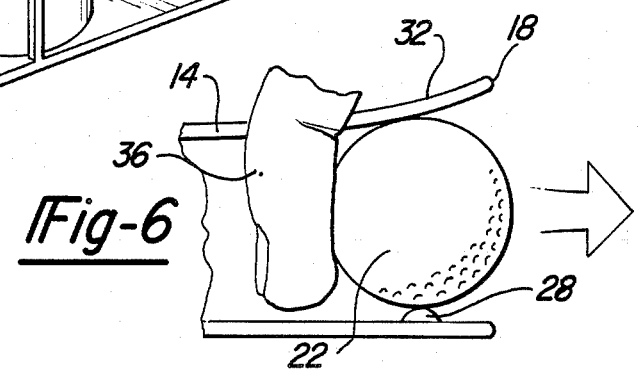
FIG. 6 is a fragmentary diagrammatic view illustrating a preferred embodiment of the present invention.

With reference now particularly to FIG. 2 and 6, each tube 14 includes a flexible sidewall portion 32 adjacent each end 16 and 18. This flexible sidewall portion 32 flexes outwardly, as shown in FIG. 6, which enables the golf balls 22 to pass over the stop member 28 and be removed out the ends 16 or 18 of the tube 14. The stop member 28 is dimensioned, together with the stiffness of the flexible portion 32, such that it is necessary for the golfer to insert his or her finger 36 through the slot 24 and able to exert enough force against the golf ball 22 to remove it from the tube 14.

Figure 5:
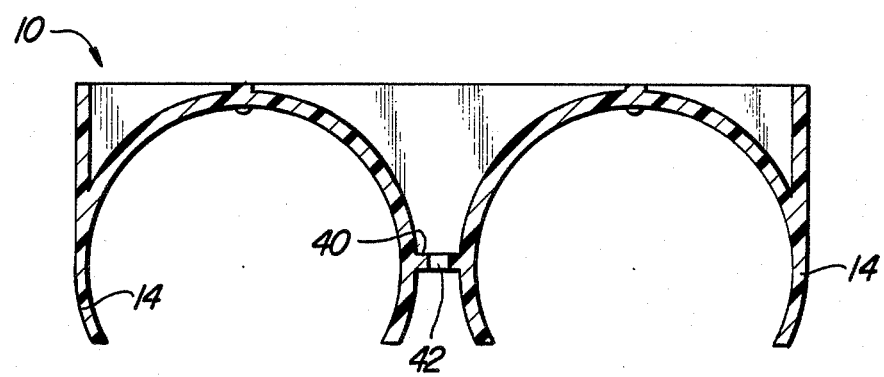
FIG. 5 is a crosssectional view taken substantially along line 5—5 in FIG. 2.

With reference now to FIGS. 2 and 5, the tubes 14 are spaced laterally apart from each other so that a central wall section 40 is formed in between the tubes 14. At least one, and preferably four, circular openings 42 are formed through the central wall portion 40 and these openings 42 are designed to slidably receive but frictionally engage golf tees 44 (FIG. 1) upon insertion into the openings 42.

With reference now to FIGS. 1 and 2, a slot 48 is also preferably formed in the central wall portion 40. This slot is dimensioned to slidably receive and frictionally engage a golf green repair tool 46 (FIG. 1).

Figure 4:
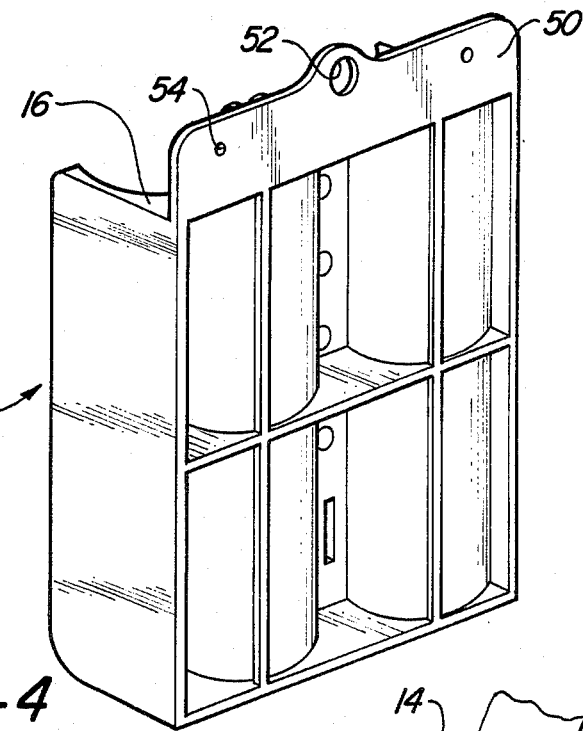
FIG. 4 is a rear view illustrating the preferred embodiment of the present invention.

With reference now to FIGS. 1 and 4, a back wall section 50 extends outwardly from one end 16 of the tubes 14 so that the back wall section 50 is generally planar. This back wall section includes a central hole 52 which enables the housing to be attached to a hook on a golf cart. At least one and preferably two other smaller openings 54 are also formed in the back wall and these openings 54 are dimensioned to slidably receive and frictionally engage a golf ball marker 56 (FIG. 1).

The entire golf accessory of the present invention is preferably of a one-piece construction and is preferably a plastic molding. As such, the golf accessory is not only lightweight and durable in use, but also relatively inexpensive to manufacture.

Having described my invention, it can be seen that the golf accessory of the present invention provides a highly convenient means for storing golf balls, golf tees, golf green repair tools and golf ball markers for the golfer.

Having described my invention, however, many modifications thereto will become apparent to those skilled in the art to which it pertains without deviation from the spirit of the invention as defined by the scope of the appended claims.

I claim:

1. A golf accessory comprising
   a housing, said housing having two elongated tubes,
   each tube being open on each end and having an interior dimensioned to receive a plurality of golf balls therein,
   each tube having a longitudinally extending slot extending along one side between the ends of each tube, said slot having a width less than the diameter of a standard golf ball,
   a stop member protruding into the interior of each tube adjacent a bottom end of each tube, each stop member having a portion substantially equidistantly spaced from the sides of the slot in its associated tube, each said stop member being dimensioned so that each said stop member abuts against and retains a golf ball in the interior of its associated tube,
   wherein each stop member is rigid with respect to said housing,
   wherein said tubes each have a radially outwardly flexible sidewall portion adjacent each bottom end which flexes outwardly to enable a golf ball to pass across said stop member and out of said tube.

2. The invention as defined in claim 1 wherein said golf accessory is of a one piece construction.

3. The invention as defined in claim 1 wherein said tubes are laterally spaced apart from each other and further comprising at least one opening formed in said housing between said tubes, said opening dimensioned to slidably receive and frictionally engage a golf tee.

4. The invention as defined in claim 3 and further comprising a slot in said housing between said tubes, said slot being dimensioned to slidably receive and frictionally engage a golf green repair tool.

5. The invention as defined in claim 1 wherein said housing comprises a back plate extending outwardly from one end of said tubes, and at least one opening in said back plate, said back plate opening being dimensioned to slidably receive and frictionally engage a golf ball marker.

* * * * *